(12) United States Patent
Thorin

(10) Patent No.: US 6,621,983 B2
(45) Date of Patent: Sep. 16, 2003

(54) FLOOR HEATING DEVICE WITH SELF-REGULATING CABLE

(75) Inventor: Micael Thorin, Hindås (SE)

(73) Assignee: Tyco Thermal Controls Nordic Aktiebolag, Hindas (SE)

( * ) Notice: Subject to any disclaimer, the term of this patent is extended or adjusted under 35 U.S.C. 154(b) by 0 days.

(21) Appl. No.: 10/150,158

(22) Filed: May 20, 2002

(65) Prior Publication Data

US 2002/0136543 A1 Sep. 26, 2002

Related U.S. Application Data

(63) Continuation of application No. 09/622,100, filed as application No. PCT/SE99/00174 on Feb. 10, 1999, now abandoned.

(30) Foreign Application Priority Data

Feb. 11, 1998 (SE) .............................................. 9800383

(51) Int. Cl.[7] ................................................ H05B 3/26
(52) U.S. Cl. ........................ 392/435; 219/213; 219/505; 338/214
(58) Field of Search ................................ 392/435–437, 392/432; 219/213, 505; 338/22 R, 214

(56) References Cited

U.S. PATENT DOCUMENTS

| 3,277,273 A | 10/1966 | Williams ...................... 219/213 |
| 4,733,057 A | 3/1988 | Stanzel et al. ............... 219/213 |
| 4,952,775 A | 8/1990 | Yokoyama et al. .......... 219/213 |
| 5,461,213 A | 10/1995 | Rodin ......................... 219/213 |
| 5,558,794 A | 9/1996 | Jansens ....................... 219/549 |
| 5,788,152 A | 8/1998 | Alsberg ........................ 237/69 |
| 6,018,138 A | 1/2000 | Kurita ......................... 219/213 |
| 6,043,455 A | 3/2000 | Kurita ......................... 219/213 |
| 6,092,587 A | 7/2000 | Ingram ........................ 165/56 |

FOREIGN PATENT DOCUMENTS

| EP | 199566 | 10/1986 | |
| FR | 2616289 | 12/1988 | ................. 392/435 |
| JP | 53-18237 | 2/1978 | ................. 392/437 |
| JP | 57-157940 | 9/1982 | ................. 392/437 |
| JP | 62-5026 | 1/1987 | |
| JP | 2-143032 | 6/1990 | |
| JP | 3-207928 | 9/1991 | |
| JP | 4-104493 | 4/1992 | |
| JP | 9-306645 | 11/1997 | |
| SE | 134214 | 10/1929 | ................. 392/435 |

*Primary Examiner*—John A. Jeffery
(74) *Attorney, Agent, or Firm*—Birch, Stewart, Kolasch & Birch, LLP

(57) ABSTRACT

The invention relates to a floor heating device comprising an electric heating cable extending backwards and forwards underneath a floor surface to be heated. Metal rectangular or square panels are provided with channels extending in parallel in the direction of deposition of the panels. Each metal panel is fitted on its reverse side with an insulating panel in a sandwich construction so that the channels of the metal panel penetrate into the insulating panel material. The assembled panels are deposited on the support of the floor in juxtaposed relationship in the longitudinal and transverse directions such that each channel of one metal panel continues into another channel formed in the adjacent metal panel at the end edge sides of the first metal panel. The heating cable is arranged inside the channels so as to extend from one metal panel to the next backwards and forwards across the floor.

17 Claims, 3 Drawing Sheets

FLOOR HEATING DEVICE WITH SELF-REGULATING CABLE

This application is a continuation of application Ser. No. 09/622,100, filed on Sep. 18, 2000, abandoned and for which priority is claimed under 35 U.S.C. §120. Application Ser. No. 09/622,100 is the U.S. National Phase of PCT International Application No. PCT/SE99/00174 filed on Feb. 10, 1999 under 35 U.S.C. §371. The entire contents of each of the above-identified applications are hereby incorporated by reference. This application also claims priority of Application No. 9800383-3 filed in Sweden on Feb. 11, 1998, under 35 U.S.C. §119.

The invention relates to a floor heating device comprising an electric heating cable extending in lengths forwards and backwards underneath the floor surface to be heated.

Various prior-art devices exist for heating and heat-regulating a floor surface with the aid of an electric heating cable. For example from EP,B1,588 911 is already known a floor structure according to which flooring panels are deposited on a floor surface in spaced-apart relationship so as to form inter-panel channels in which the heating cable is received. The structure also comprises a heat-reflecting sheet applied on the metal panels and tucked into the channels underneath the heating cable.

This arrangement results in a comparatively complex structure and considerable work is required to produce a heatable floor. It is, for example, necessary to deposit the panels and fix them in a predetermined spaced-apart relationship to ensure that the width of the formed channels is adapted to the width of the heating cable that is to be placed inside the channels. The application of the heat-reflecting sheet involves even more extra work.

From EP,B1,360 889 is further known a heating element in the form of a panel formed with channels disposed in parallel and housing a heating cable extending inside the channels. The device comprises semispherical bodies located between the channel mouths, on two opposite sides of the panel, and these bodies form rounded surfaces against which the cable abuts when formed into bends as it exits from one channel to enter into the adjacent one, for the purpose of preventing buckling or cracking damages on the cable. However, this construction is not intended to be built into floors and to serve as a floor heating means but if forms in itself a complete independent heating panel.

SUMMARY OF THE INVENTION

The invention provides a floor heating device, which is a further development of the prior-art technology and which permits installation in a rapid, practical and convenient manner of a heating cable in a floor, irrespective of the foundation or structure of the latter.

The floor heating device in accordance with the invention utilizes a so called self-regulating cable, a feature which further facilitates the installation of floor heating, irrespective of the type of flooring concerned, as will appear from the following description.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

A self-regulating cable comprises two conductors arranged in parallel and surrounded by a semi-conductive plastics material, the conductivity of which varies with the temperature and ceases completely at sufficiently elevated temperatures. When the two conductors are connected to different electrical potentials, a current flows radially through the semi-conductive plastics material intermediate the conductors along the entire cable, whereby heat is generated. The magnitude of the current varies with the conductivity of the plastics material and is at is peak at the lowest-temperature regions of the cable, in which regions consequently heat is generated, and at its bottom at the highest-temperature regions of the cable, in which regions consequently less heat is generated. In this manner, the heating capacity of the cable becomes self-regulating. In addition, the fire-resistance of the cable is higher than that of a conventional cable, since the current between the conductors, and in consequence thereof the heating efficiency, ceases completely in the sections of the cable where the temperature is too high. In addition, a self-regulating cable may be severed into arbitrary lengths, since each conductor need only be connected to its respective potential at one of its ends.

The fact that the electric heating cable is self-regulating is a condition for easy installation in all situations of the device in accordance with the invention. A conventional electric cable, were it arranged in the inventive panels, would fail to satisfy the fire-safety regulations when used for example in combination with wooden flooring applied directly on top of the panels.

Figure 1:
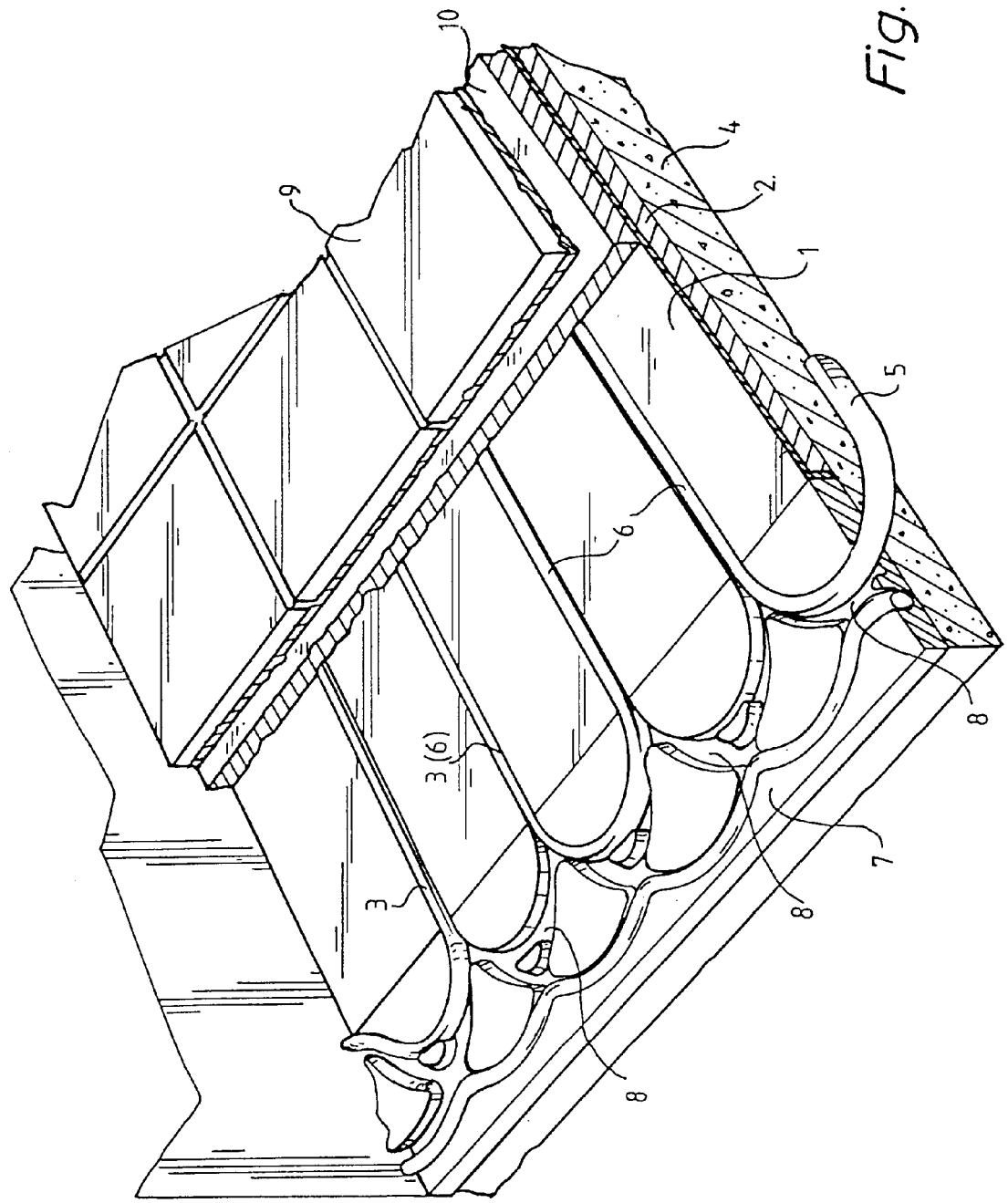
Figure 2:
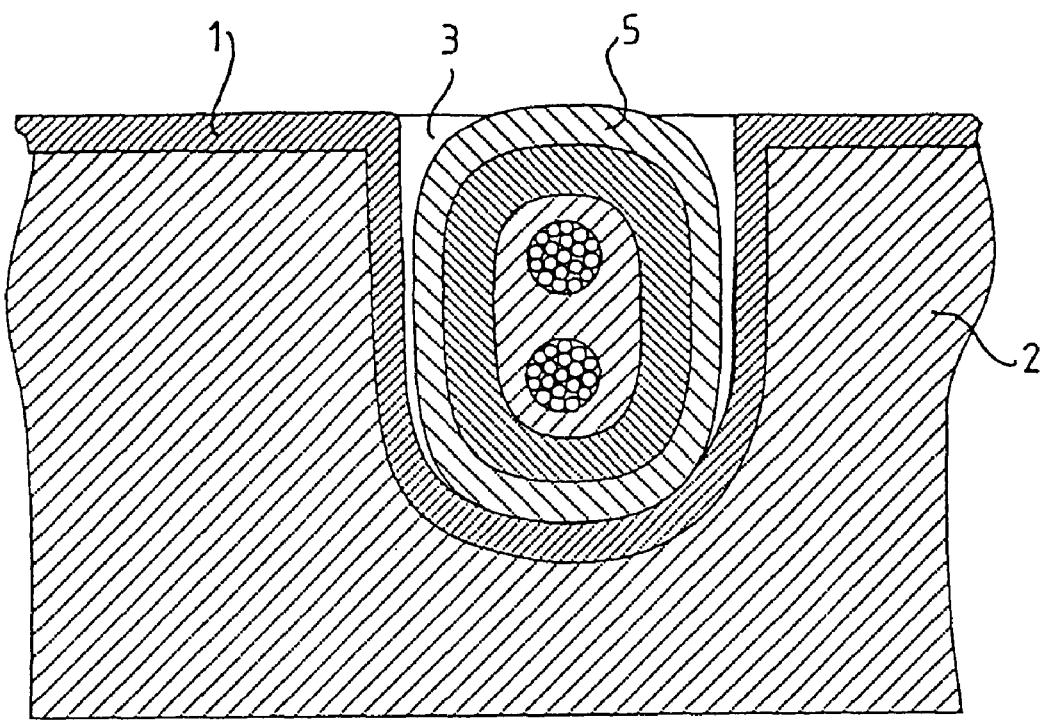
Figure 3:
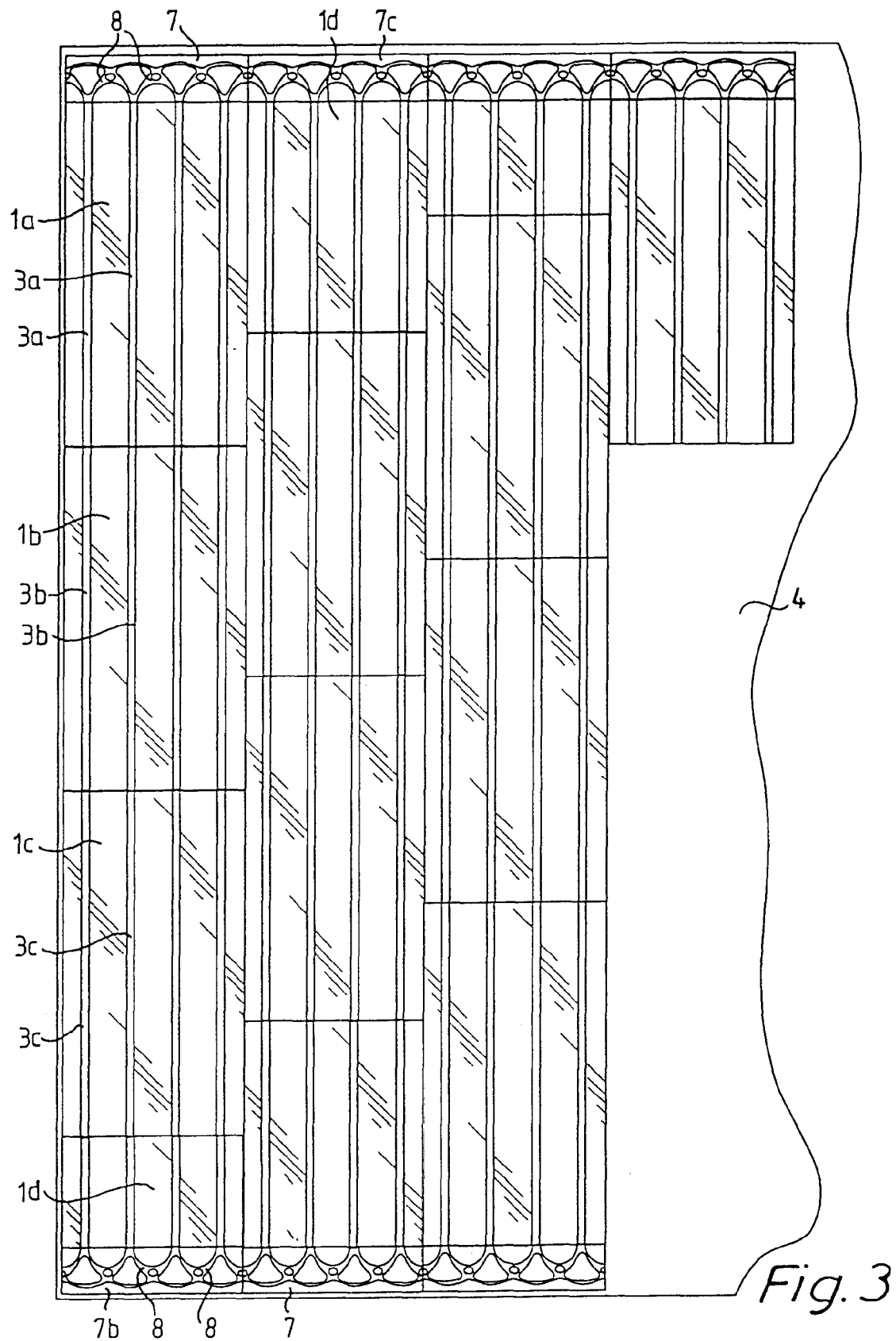

The invention will be described in more detail in the following with reference to the accompanying drawings, wherein FIG. 1 is a perspective broken view of the floor heating device, FIG. 2 is a sectional view, which on a larger scale illustrates a channel and a heating cable contained therein, and FIG. 3 is a plan view of a floor during assembly of the floor heating device.

DETAILED DESCRIPTION OF THE INVENTION

The device comprises square or rectangular panels 1 of metal, preferably of aluminium. On its reverse side, the metal panel 1 is provided with an insulating panel 2, preferably made from cellular plastic. The metal panels 1 are formed with channels 3 extending in inter-parallel relationship and produced by subjecting the panel material to a corrugating operation. The panels 1 and 2 are glued together in a sandwich construction, whereby the channels 3 formed in the metal panel 1 will penetrate into the material of the insulating panel 2, see FIG. 2. The channels 3 are configured for receiving an electric cable 5 therein, the latter, after having been deposited inside the channels 3, forming lengths 6 spaced a predetermined centre distance apart. Preferably, the channels 3 are sufficiently deep to ensure that the upper face of the cable 5 will be essentially level with the upper face of the metal panel 1, as appears from FIG. 2.

FIG. 1 illustrates a metal panel 1 and an insulating panel 2 deposited on a concrete support 4. The latter could, however, equally well consist of wooden boards or be of some other material.

The device also comprises an end piece 7 intended to be placed between a wall in the room wherein floor heating is to be installed, and an end edge face of the first and last panels 1 and 2, respectively, in each row of panels in the room. This end piece 7 is formed with recesses 8 for reception therein of the cable 5 as the latter forms a bend when exiting from one channel 3 and entering into an adjacent one, as appears from FIG. 1.

In the installation of prior-art floor-heating technique as applied today, a chipboard or a gypsum board is initially deposited on a wooden or concrete support. In accordance with one alternative, a wire net is then deposited on top of the chipboard/gypsum board, whereupon a heating cable is deposited in a tortuous configuration on the wire net, to which it is then fixed. According to another alternative procedure, the heating cable is deposited in a tortuous pattern directly on the chipboard/gypsum board and is attached thereto by means of clamps. If the top flooring is to consist of ceramic tiles, cement mortar is applied on top of the cable and the wire net, when used, whereupon the ceramic tiles are laid out in the cement mortar. If the flooring is to consist of wood or plastic, a layer of putty is applied on top of the heating cable in the place of cement mortar, whereupon the wooden or plastic flooring is deposited on top of the putty layer.

With the aid of the device in accordance with the invention the following procedure is adopted instead. An end piece 7 is placed in a corner of the room to be fitted with floor heating, whereupon a number of metal panels 1a, 1b, 1c together with insulating panels 2 are placed edge to edge in such a manner that each one of the channels 3a of the first deposited panel 1a (in each row) are aligned with the respective channels 3b in the following panel 1b, and said channels 3b are aligned with the respective channels 3c in the panel 1c thereafter, and so on, as appears from FIG. 3. Should the next panel 1d be too long, the panel is cut in such a manner that the remaining part of the thus shortened panel together with a new end piece 7b fill up the remaining part of the length of the room. The following row is started by placing a third end piece 7c in juxtaposed position relative to the first end piece 7, whereupon the cut off part of the metal panel 1d together with the insulating panel 2 underneath are laid down in contacting relationship with the end piece 7c and the metal panel 1a. The insulating panels 2 are anchored to the support 4 for instance by means of gluing, and one proceeds in the same manner as described above, until the entire floor support 4 is covered. If the panels 1 and 2 in the last row have a width exceeding the remaining space of the room, they are cut lengthwise.

Remaining measures to be taken to produce the finished floor are performed in the manner described above, which as shown in FIG. 1 involves laying of ceramic tiles 9, which are laid in a layer 10 of cement mortar applied on top of the metal panel 1 and cable 5. However, if the surface layer of the floor is to be a laminate flooring material or a wooden floor (parquet), the layered panels 1, 2 need not be anchored to the support. Nor do they need to be covered by putty, since satisfactory fire resistance safety is achieved thanks to the self-regulating properties of the cable.

It is now possible to deposit the heating cable 5 rapidly and conveniently in the channels 3 and to form it into bends in the recesses 8, whereupon the cable ends are connected to the mains voltage. Thanks to the use of a self-regulating cable having built-in temperature protection, which eliminates the risks of excess heating, it is not necessary to calculate a definite length of the heating cable but the cable can be deposited in the simplest possible manner inside the space prepared for it, formed by the channels 3.

The floor heating device in accordance with the invention provides a floor heating arrangement which is efficient and energy-saving. The insulating panel 2 efficiently reduces heat losses into the floor support 4. The metal panel 1 reflects upwards, towards the floor surface, any downwards-directed thermal radiation from the cable 5. The functions of the panel 1 and the panel 2 thus combine to making the floor heating device as efficient as possible.

In addition to the advantages obtained by the floor heating device in accordance with the invention owing to the convenient installation thereof, the heating device is also easily adaptable to the various heating requirements of different floors. For instance, the end piece 7 is configured in a manner making it possible to arrange the heating cable 5 such that the spacing between the cable lengths 6 varies, i.e. in the case of one type of floor the cable lengths may be spaced single distances apart, as shown in FIG. 1, whereas in another floor double or triple spacings between the cable lengths 6 may be preferred, in which latter case the intermediate channels 3 thus are not made use of. This possibility is an essential advantage, since it allows adaptation of the effect of the electric floor heating per square meter.

What is claimed is:

1. An electrically heated floor, comprising:
   an electric heating cable extending underneath a floor surface to be heated; and
   pre-assembled panels, each of said pre-assembled panels including a continuous rigid metal panel formed with channels and fitted on a reverse side with an insulating panel in a sandwich structure in such a manner that the channels of the continuous rigid metal panel partially penetrate into the material of the insulating panel, wherein:
   the assembled panels are deposited on a support below the floor surface;
   the heating cable is arranged inside said channels; and
   the heating cable is a self-regulating heating cable.

2. The electrically heated floor according to claim 1, further comprising end pieces being formed with recesses for reception therein of bends of the cable formed as said cable leaves one channel to enter into another.

3. The electrically heated floor according to claim 1, wherein the continuous rigid metal panels are formed of aluminium.

4. A The electrically heated floor according to claim 1, wherein the insulating panels are formed of cellular plastics material.

5. The electrically heated floor according to claim 1, wherein the floor surface is wood or plastic deposited directly upon the continuous rigid metal panel.

6. The electrically heated floor according to claim 1, wherein the floor surface is ceramic tile laid on a layer applied on top of the continuous rigid metal panel.

7. A pre-assembled floor heating panel for use with a self-regulating cable, and adapted to be used on an existing supporting surface comprising:
   a continuous rigid sheet of metal formed with at least one channel adapted to receive the self-regulating heating cable, and
   an insulating layer located beneath said continuous rigid metal sheet, said at least one channel partly penetrating said insulating layer, whereby the insulating layer provides insulation between a floor supporting surface and at least one channel of said continuous rigid sheet of metal.

8. The pre-assembled floor heating panel of claim 7, wherein each channel extends between opposite sides of the panel.

9. The pre-assembled floor heating panel of claim 7, wherein at least one channel extends between two end points located on one side of the panel.

10. The pre-assembled floor heating panel of claim 7, wherein the continuous rigid metal sheet is formed of aluminium.

11. The pre-assembled floor heating panel of claim 7, wherein the insulating layer is formed of cellular plastics material.

12. A floor heating system adapted to be used on an existing supporting surface, comprising:

pre-assembled panels, each of said panels being combinable with other ones of said panels to form said floor heating system, and each of said panels including:

a continuous rigid sheet of metal, formed with at least one channel, at least one of said at least one channel extending between different sides of the panel, so that, when several of said panels are placed on a floor surface, a continuous channel is formed;

an insulating layer located beneath said continuous rigid metal sheet, said channels partly penetrating said insulating layer, whereby the insulating layer provides insulation between a floor supporting surface and at least one channel of said continuous rigid sheet of metal; and a heating cable, fitted in said at least one channel, said heating cable having inherent properties to generate more heat when at a relatively cooler temperature and generate less heat when at a relatively hotter temperature.

13. The floor heating system of claim 12, wherein said pre-assembled panels include end piece panels, each having at least one channel extending between two end points located on one side of the pre-assembled panel.

14. The floor heating system of claim 13, wherein said panels include intermediate panels, each having at least one channel extending between opposite sides of the panel.

15. The floor heating system of claim 12, wherein the continuous rigid metal sheet is formed of aluminium.

16. The floor heating system of claim 12, wherein the insulating layer is formed of cellular plastics material.

17. The floor heating system of claim 12, wherein the heating cable is a self-regulating heating cable.

* * * * *